United States Patent
Ferguson (10) Patent No.: US 8,768,020 B2
(45) Date of Patent: Jul. 1, 2014

(54) METHOD OF DETECTING VISUAL STRESS AND PHOTOSENSITIVE EPILEPSY TRIGGERS IN VIDEO AND MITIGATION DEVICE

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 229 days.

(21) Appl. No.: 13/340,481

(22) Filed: Dec. 29, 2011

(65) Prior Publication Data
US 2013/0169880 A1    Jul. 4, 2013

(51) Int. Cl.
*G06K 9/00*    (2006.01)

(52) U.S. Cl.
USPC .......................................................... 382/128

(58) Field of Classification Search
None
See application file for complete search history.

(56) References Cited

U.S. PATENT DOCUMENTS 6,119,083 A * 9/2000 Hollier et al. .................. 704/243

OTHER PUBLICATIONS

Harding, Graham FA, and Takeo Takahashi. "Regulations: what next?." Epilepsia 45.s1 (2004): 46-47.*

* cited by examiner

*Primary Examiner* — Nirav G Patel
(74) *Attorney, Agent, or Firm* — Michael A. Nelson; Marger Johnson & McCollom PC (57) ABSTRACT

Embodiments of the invention include a method for detecting visual stress scenes in a video. First, a video that includes scenes that may cause visual stress in some viewers is received. Then, a signal representing human perceptual response from scenes in the video is generated. An envelope follower is applied to the perceptual response, from which indications that the video contains visual stress scenes may be generated. The output may also be used to control a contrast limiting circuit, which modifies the original video to remove or minimize those scenes that may cause visual stress. Additionally, output from the envelope follower may be converted to a simulated EEG signal and used to verify accurate modeling by comparing the simulated EEG signal to one measured directly from a viewer watching the same video.

23 Claims, 12 Drawing Sheets

FIGURE 7A 1 Loop

FIGURE 7B 2 Parallel

FIGURE 7C 3 Parallel

FIGURE 7D 4 Parallel

METHOD OF DETECTING VISUAL STRESS AND PHOTOSENSITIVE EPILEPSY TRIGGERS IN VIDEO AND MITIGATION DEVICE

FIELD OF THE INVENTION

This disclosure is directed toward video analysis systems, and, more particularly, to a system and method that accurately detects visual stress and photosensitive epilepsy triggers in video, and a device that mitigates such triggers.

BACKGROUND

Epilepsy is a neurologic disorder that causes those afflicted to have seizures. Sometimes external stimuli trigger the seizures. For example, those with photosensitive epilepsy (PSE) have an increased likelihood of experiencing a seizure when exposed to pulsating light or patterns that include strong contrast of light and dark areas. Even if not seizure inducing, pulsating, flashing, or high contrast images may cause visual discomfort to viewers of video, such as broadcast on television or shown in movie theaters. The flashing images may be due to video content and/or effects of video processing. Some countries require that broadcast video be pre-screened for such PSE triggers. The current requirements dictate that video be checked for flashing and checkerboard or bar type patterns with more than 20 nit differences over more than one quarter of the screen. Although an International Telecommunication Union (ITU) standard includes for checking of flashing, there is no detection method outlined other than suggesting a manual approach: viewers watch video using ITU-R BT.500 specified home viewing conditions and determine if the video seems to have flashes, etc. Nor are the guidelines inclusive of all PSE triggers.

One marketed product, Cambridge Research Systems' Harding Flash and Pattern Analyzer claims to screen for triggers following the guidelines, which means it likely searches video for temporal (flash) or spatial (bar or checkerboard) pattern detection.

No current systems, however, analyze video images and produce quantitative indications, predictions, alarms, and causes of visual discomfort. Further, there is no device that actively detects video having scenes that could possibly trigger PSE seizures, and actively mitigates such scenes.

Embodiments of the invention address this and other limitations of the prior art.

SUMMARY OF THE INVENTION

A scalable (over image resolution, frame rate, real-time vs. higher accuracy, etc.) method provides quantitative indications, predictions, alarms and causes of visual discomfort. These methods may be used to implement the existing United Kingdom, Japanese, ITU and other broadcasting guidelines, as well as a significant superset of PSE trigger video stimuli not directly covered by these guidelines. It quantifies the degree of likely visual discomfort while allowing for variations in the population regarding photosensitivity. Further, it accounts for differences in stimuli due to different displays and viewing conditions, such as those home viewing screens as well as cinematic, PDA and other common ways video may be viewed.

Particular embodiments of the invention are directed to a method for detecting visual stress scenes in a video, including receiving a video including scenes that may cause visual stress in some viewers and generating a signal representing human perceptual response from scenes in the video. Next, an envelope follower is applied to the perceptual response signal, and an indication that the video contains visual stress scenes is generated based on the output of the envelope follower. Other embodiments include actively reducing contrast of the input video based on the measured likelihood that the particular scene may cause visual stress to some users. Further, output of the envelope follower may be converted into a simulated EEG signal and compared to actual measured EEG signals from viewers who watched the same video, to verify the accuracy of the visual stress detector.

DETAILED DESCRIPTION

Figure 1:
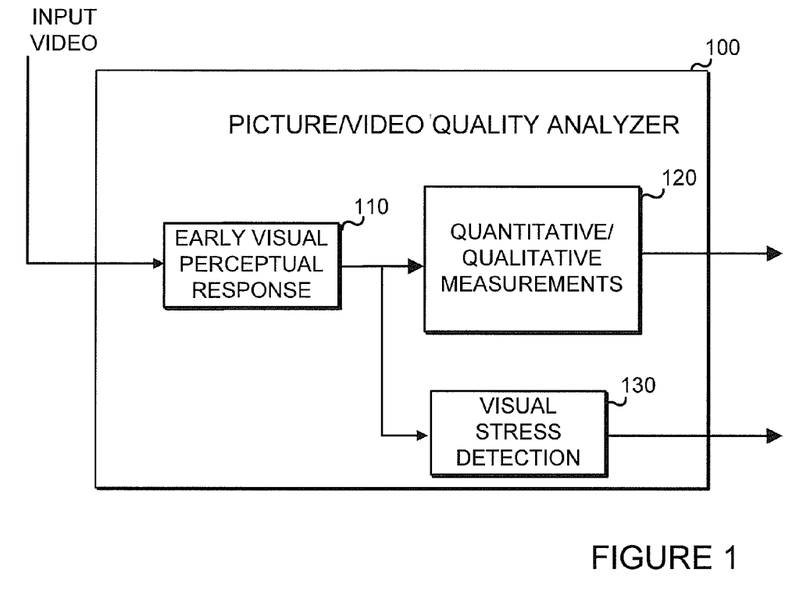
FIG. 1 is a functional block diagram of a picture/video quality analyzer having a visual stress detection system.

FIG. 1 is a functional block diagram of a picture/video quality analyzer having a visual stress detection system according to embodiments of the invention. A picture quality analyzer 100 accepts as input either pictures or a stream of pictures in video form. In this disclosure the analyzer 100 is referred to as a picture quality analyzer, or just an analyzer, whether it is accepting video or still images. An early visual perceptual response block 110 processes the input video through early visual perception, such as spatiotemporal filtering before splitting the processed video into two paths. A measuring block 120 then analyzes the video and generates quantitative and qualitative measures, portions or all of which may be sent out of the analyzer 100 as data, or may be used internally. A visual stress detection module 130 analyzes the pre-processed video for scenes or patterns that may potentially cause visual stress, such as discomfort for the user, or may potentially act as a trigger for a seizure of one afflicted with photosensitive epilepsy (PSE). For brevity, in this disclosure, all scenes that may cause visual stress are referred to as PSE triggers, regardless of whether the visual stress is severe enough or has enough duration to cause a seizure to occur.

Figure 2:
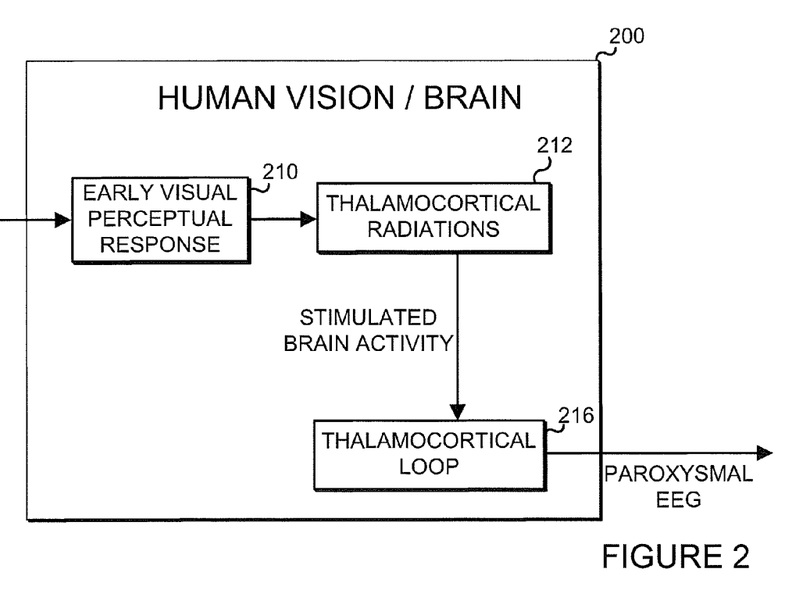
FIG. 2 is a functional block diagram of a human vision model including the triggering mechanism and region of the brain thought to be responsible for PSE seizures.

FIG. 2 is a functional block diagram of human vision input and its resultant brain response areas that are material for this disclosure. Thalamocortical radiations 212 are fibers that connect the thalamus and the cerebral cortex in the brain, while the thalamocortical loop 216 is an ensemble of functional loops, each consisting of cortical, reticular and thalamocortical neurons. Cortical stimulation causes a sequence of spindle waves in the reticular cell and a series of spikes in the thalamocortical cell. The thalamocortical loops control the propagation of sensory information and are involved in the production of sleep spindles and absence seizures. Brain output may be monitored and evaluated using an EEG (Electroencephalogram).

Figure 3:
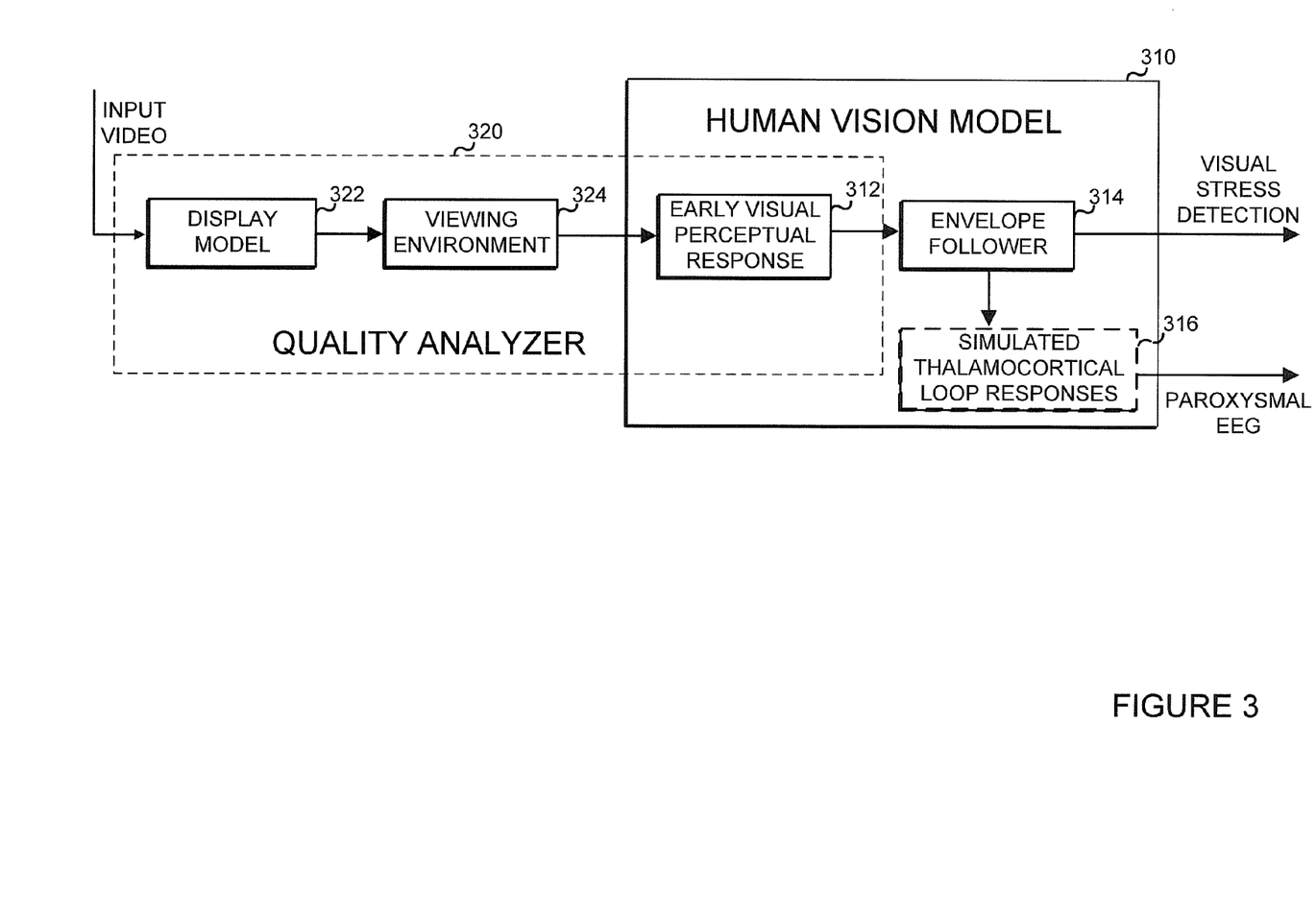
FIG. 3 is a functional block diagram of portions of a quality analyzer including visual stress detection and measurement system according to embodiments of the invention.
Figure 4:
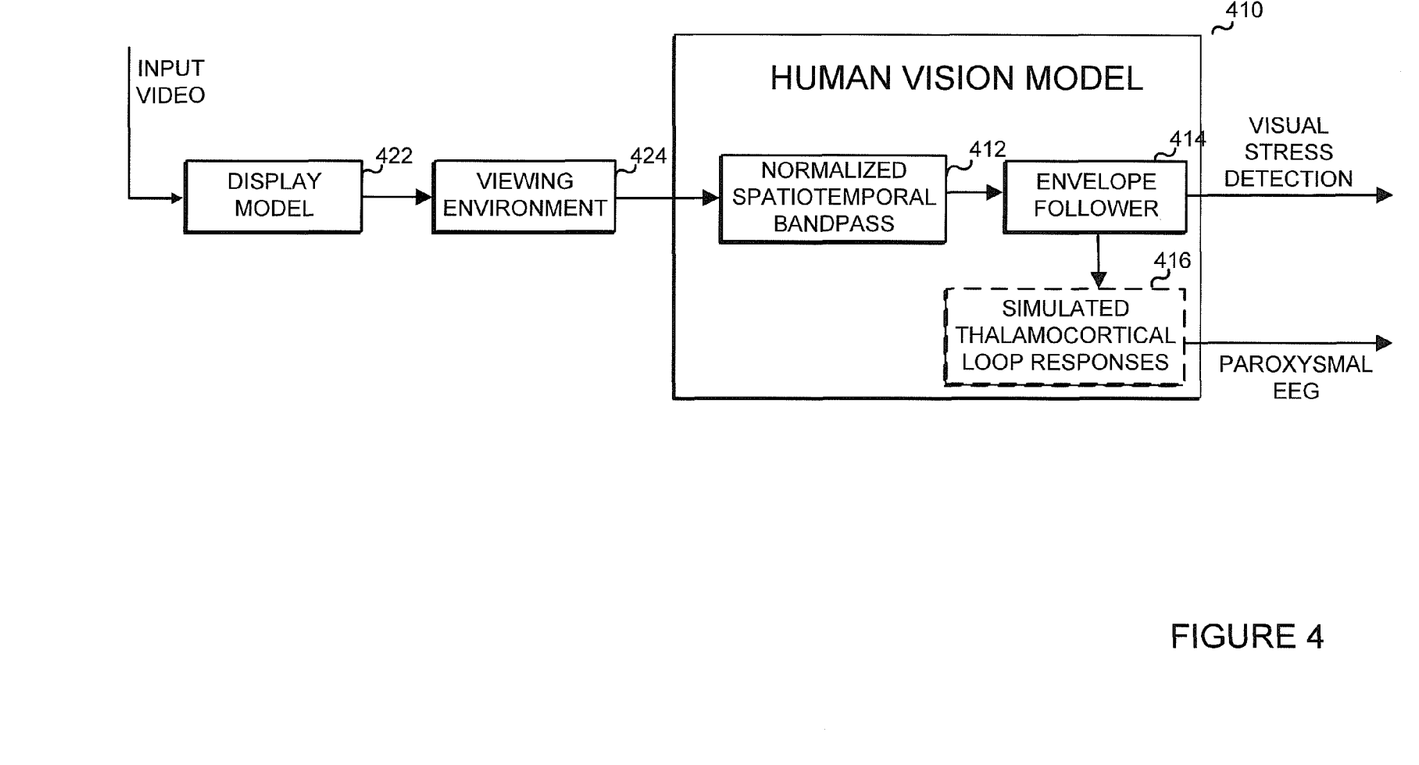
FIG. 4 is a functional block diagram of portions of another quality analyzer including visual stress detection and measurement system according to embodiments of the invention.

FIGS. 3 and 4 are a functional block diagram of portions of a quality analyzer including visual stress detection according to embodiments of the invention. In FIG. 3, an existing quality analyzer 320 may provide the functions of display modeling 322, viewing environment 324, and early visual perceptual response 312. Description of these functions may be found, for instance, in U.S. Pat. No. 6,975,776, entitled Predicting Human Vision Perception and Perceptual Difference. These functions include spatiotemporal pooling, giving a scalar value representing the perceptual contrast per temporal sample (i.e. an overall perceptual contrast value per video frame). The output of the early visual perceptual response 312 is very accurate, and follows the human visual perceptual response very closely. Because of the display model 322 and viewing environment 324, the perceptual response accounts for different color response of the output display, as well as display characteristics and the viewing environment in which the display is being viewed. This precision, however, of using an adaptive, non-linear filter for the visual perceptual response block 312 comes at a relatively high computing cost. Instead, in FIG. 4, the early visual perceptual response 312 block may be replaced for purposes of this invention by a series of spatial and temporal filters. For example, a normalized spatiotemporal bandpass filter 412 of FIG. 4 may include separate three dimensional filters for center and surround areas, each a cascade of spatial and temporal filters. In the following case (showing temporal filtering only), consider the spatial filter output was the input to the temporal filter. Then, for each pixel in a video frame, the temporal filter can be applied as follows (n is the index representing temporal sample or frame number in this example):

$$K1 = 0 \quad b0min = 0.4096 \quad b0cmin = 1 \quad surLum_0 = 0 \quad centLum_0 = 0$$

$$\begin{pmatrix} b0_{n+1} \\ b0c_{n+1} \\ centLum_{n+1} \\ surLum_{n+1} \end{pmatrix} := \begin{bmatrix} clip(surLum_n \cdot K1 + b0min) \\ clip2(surLum_n \cdot K1c + b0cmin) \\ reset_n \cdot [centLum_n \cdot (1 - b0c_n) + input_n \cdot b0c_n] \\ reset_n \cdot [surLum_n \cdot (1 - b0_n) + input_n \cdot b0_n] \end{bmatrix}$$

$$centLum1_n := centLum_n \quad surLum1_n := surLum_n$$

$$\begin{pmatrix} b0_{n+1} \\ b0c_{n+1} \\ centLum_{n+1} \\ surLum_{n+1} \end{pmatrix} := \begin{bmatrix} clip(surLum_n \cdot K1 + b0min) \\ clip2(surLum_n \cdot K1c + b0cmin) \\ reset_n \cdot [centLum_n \cdot (1 - b0c_n) + centLum_n \cdot b0c_n] \\ reset_n \cdot [surLum_n \cdot (1 - b0_n) + surLum1_n \cdot b0_n] \end{bmatrix}$$

This is a form close to the temporal portion of the spatiotemporal filter method described in U.S. Pat. No. 6,907,143, techniques of which may be used for the above-described filters. Note that since b0cmin=1, the temporal center filter is transparent and may be removed for this sample rate. This is an optimization step that does not exactly match the response of the corresponding anatomical portion of the human vision system, but the envelope follower portion, described below, has a low-pass response which compensates for this. Also, b0cmin is further justified (as well as the K1=0 setting) because for the light stimulus we are interested in detecting for PSE triggers, generally the spatiotemporal contrast is large and the peak luminance is usually large enough to cause the surLum[n]*K1 term to be large enough to cause the b0[n] values to clip at unity.

The spatial processing may be performed by techniques disclosed in the '143 patent referenced above, again simplified due to surLum[n]*K1 being max during the peaks. Together these simplifications allow for much for streamlined, faster spatiotemporal filtering.

Then the filtered difference is $$diffLum := centLum - surLum$$

The perceptual contrast as a function of the center, surround and difference for high contrast video is approximated with the following simplified model:

$$pcdiff_n := \frac{diffLum_n \cdot 100}{\sqrt{baseLum^2 + |surLum_n| + |centLum_n| \cdot .1 + 10^2}}$$

This pcdiff[n] output from the normalized spatiotemporal bandpass block 412 of FIG. 4 corresponds to output of the perceptual response 312 of FIG. 4, perceptual contrast response per frame. Any of the outputs of the blocks of FIGS. 3 and 4, or data derived from them, may be output from the quality analyzer including visual stress indication as a quantitative indication, prediction, alarm, and cause of visual discomfort of the input video.

Referring back to FIGS. 3 and 4, for purposes of visual stress and PSE trigger detection, embodiments of the invention model the thalamocortical radiations 212 of FIG. 2 with an envelope follower circuit 314 as described in detail with reference to FIG. 5 below. In addition, a thalamocortical loop simulation block 316, 416, also described below, is a verification simulation that generates output that may be compared to EEG data from those known to be experiencing visual stress. Matching the output from the thalamocortical loop simulation block 316, 416 against such EEG data validates that the envelope follower 314, 414 accurately models the stimuli to onset (attack), duration and decay of paroxysmal brain responses of those who experience PSE triggers.

An example envelope follower 314, 414, for an example temporal sample rate of 4×29.97=119.88 Samples/sec, having attack and decay parameters as given below:

Envelope follower: attack := .00667  decay := .99945

Figure 5:
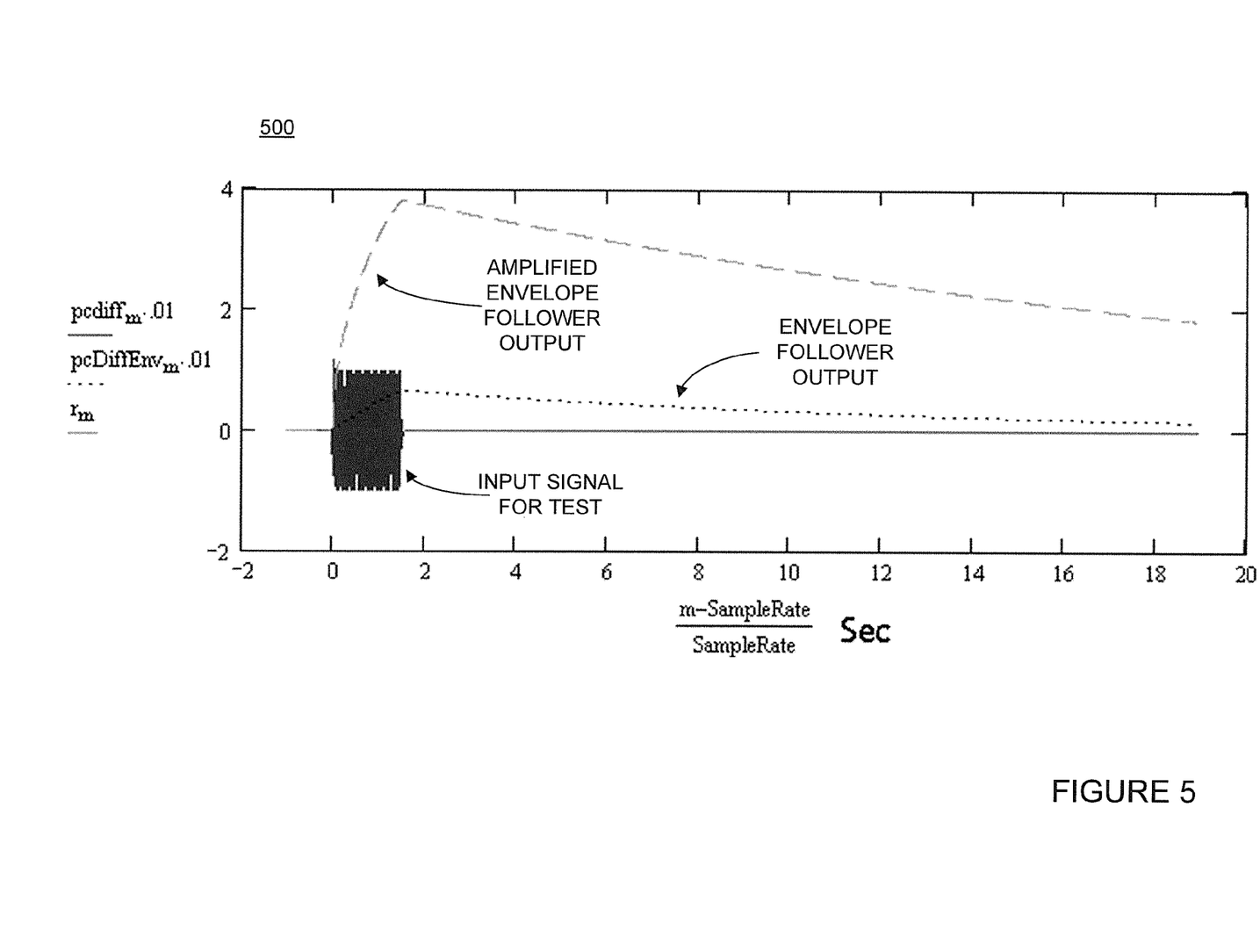
FIG. 5 is a graph of output from an envelope follower, used as a portion of the visual stress detection circuit of FIGS. 3 and 4 according to embodiments of the invention.

$reset_n := 1$  $reset_{floor[(test+1) \cdot (DurationSecs \cdot SampleRate)]-10} := 0$ $pcDiffEnv_0 := 0$  $pcDiffEnv_{n+1} := reset_n \cdot (if(|pcdiff_n| > pcDiffEnv_n, attack \cdot |pcdiff_n|, 0) + decay \cdot pcDiffEnv_n)$ FIG. 5 is a graph of output from an envelope follower, such as the envelope follower 414 of FIG. 4 and 314 of FIG. 3. In FIG. 5, an example input signal pulse train of alternating positive and negative, representing the normalized early perception output 412 of FIG. 4, was provide for approximately 2 seconds. An envelope follower output rises exponentially in response to the input. Then, after the input signal stops modulating, at approximately 2 seconds, the envelope follower slowly decays, as illustrated in FIG. 5. Also, an amplified envelope follower output is shown, which follows the same output as the envelope follower, but has higher gain.

As mentioned above, the thalamocortical loop simulation blocks 316, 416 of FIGS. 3 and 4 create a signal that models EEG signals, which are used for verifying that the envelope follower 314, 414 produces accurate results, despite the seeming simplicity of using such a simple model for the thalamocortical loop. The following model formulae are used for simulating EEG. This simple model includes a noise term to be more complete, but is not required for our purposes of verification, so is set to 0 here. FIGS. 6-11 together show how this model accounts for EEG simulation.

amplified envelope follower output with gain calibrated to result in the desired r value at two different sampling rates, a delay of 1 vs. delay of ~21 samples. Their responses are nearly identical and look superimposed on FIG. 6. Simulated thalamocortical loop responses, which are outputs of the thalamocortical loop simulation block 316, 416 of FIGS. 3 and 4, respectively, are also illustrated, one for each from the different "r" values (envelope follower responses) that they use as input, respectively.

Figure 7A:
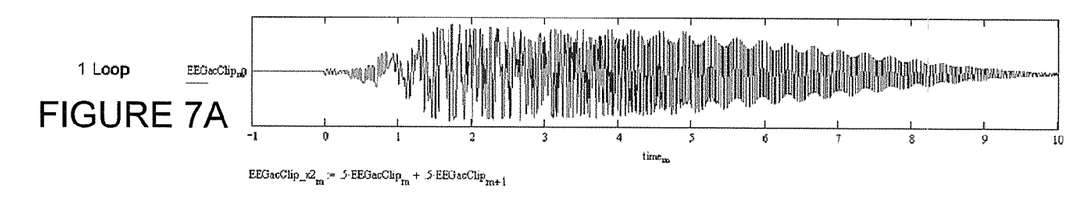
FIGS. 7A, 7B, 7C, 7D, 7E, 7F, and 7G illustrate a series of simulated EEG signals, generated using embodiments of the invention.
Figure 7B:
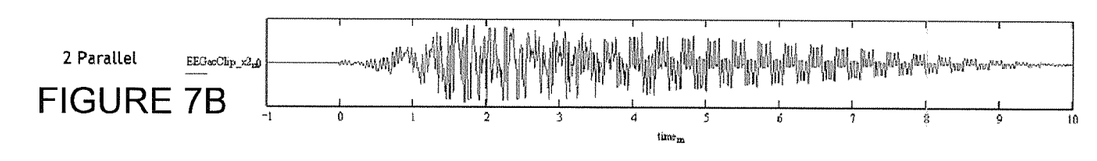
Figure 7C:
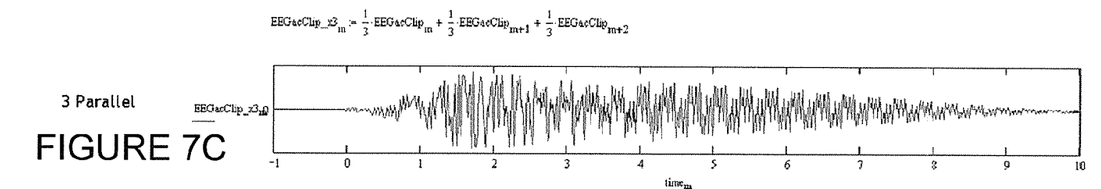
Figure 7D:
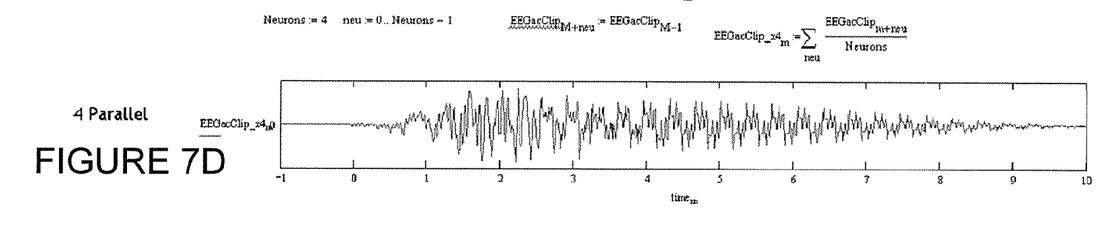

FIGS. 7A-7G illustrate a series of simulated EEG signals, generated as an ensemble of individual (3 cell) thalamocortical loops. FIG. 7A is output for a single loop, generated according to the EEG simulation equation given above. FIGS. 7B, 7C, 7D, and 7E are similarly generated, except that the simulated EEG signals include multiple signals that are added together while introducing a delay. This models activity within the thalamocortical loops themselves, which include an amount of delay based on their biochemical makeup. FIG. 7B illustrates a simulated EEG signal based on output from two parallel loops, while FIG. 7C illustrates simulated EEG signal based on output from three loops. FIG. 7D illustrates NoiseAmp = 0

$noise_m := rnd(NoiseAmp) - \dfrac{NoiseAmp}{2}$   mean(noise) = 0   max(noise) = 0   min(noise) = 0

$EEG2_0 := 0$  $EEG2_m := clip\left[ f(EEG2_{clip0(m-quanDelay)}, r_m) + .03 \cdot \left( \dfrac{wpcdiff_m + noise_m}{maxInLum} \right) \right]$ Where f( ) for this particular case is:

$f[n] = G1 \cdot f[n\text{-delay}] \cdot (1 - G2 \cdot f(n\text{-Delay}))$, where G1=(Visual cortex gain)*(Thalamocortical gain)
G2=Thalamic reticular gain
Delay=Thalamocortical loop delay Or, equivalently, $f[n+delay] = G1 \cdot f[n] \cdot (1 - G2 \cdot f[n])$ For delay normalized to 1:

$f[n+1] = G1 \cdot f[n] \cdot (1 - G2 \cdot f[n])$

And for G2*f[n] substituted with x[n]

$x[n+1]/G2 = (G1 \cdot x[n]/G2) \cdot (1 - x[n])$ multiplying both sides by G2:

$x[n+1] = G1 \cdot x[n] \cdot (1 - x[n])$

Also, for this EEG simulation, the clip functions may be implemented as $clip(x) = if(x>1, 1, if(x<0, 0, x))$.

Figure 6:
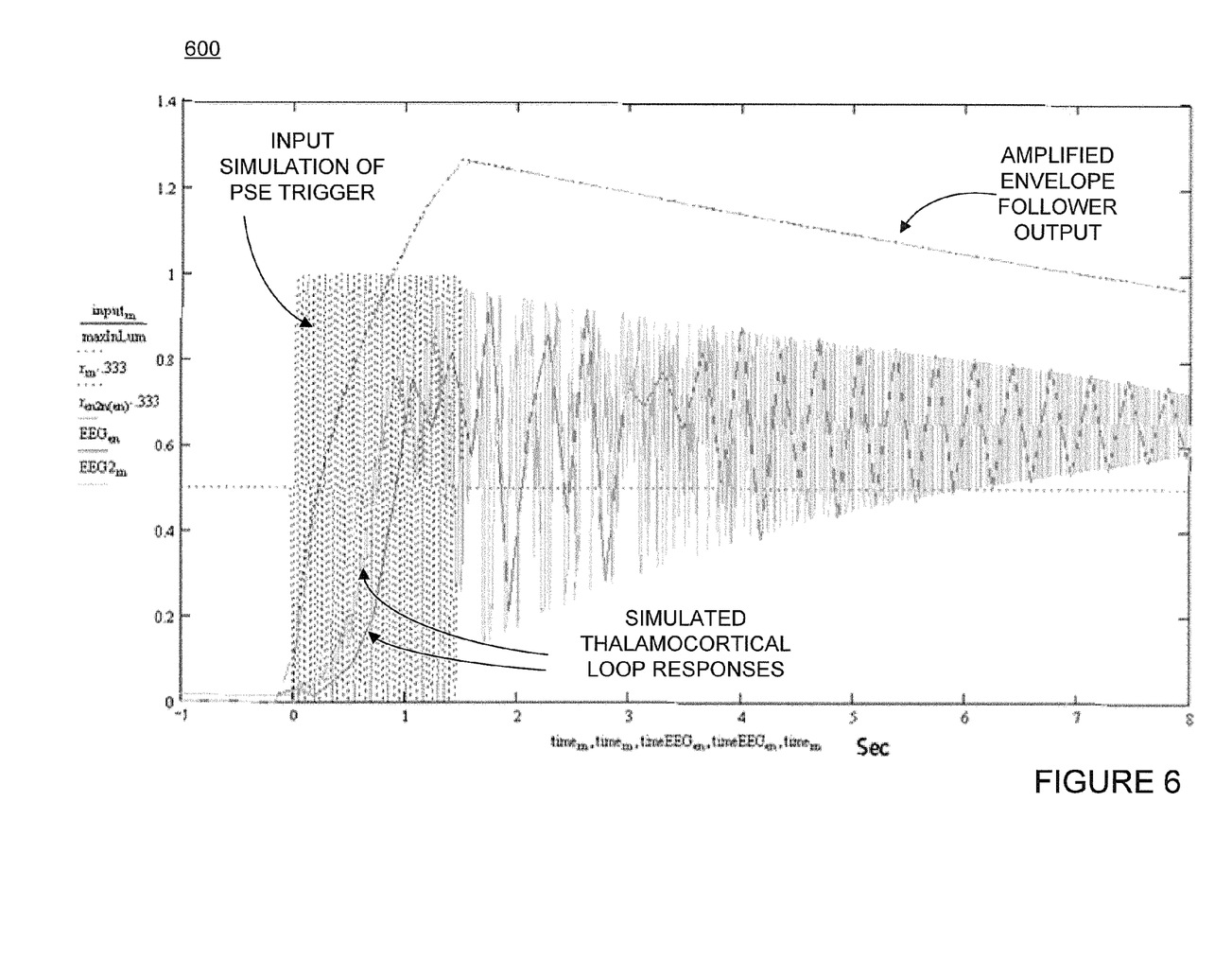
FIG. 6 is a graph that illustrates a response of both the envelope follower as well as an output of the thalamocortical loop simulation block of FIGS. 3 and 4 according to embodiments of the invention.
Figure 7E:
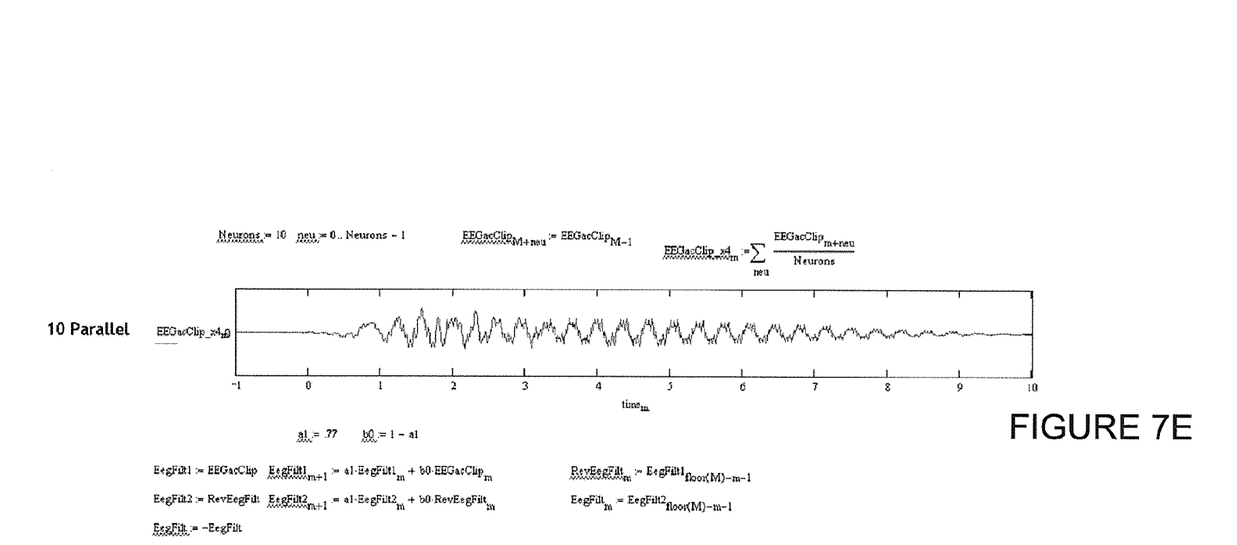
Figure 7F:
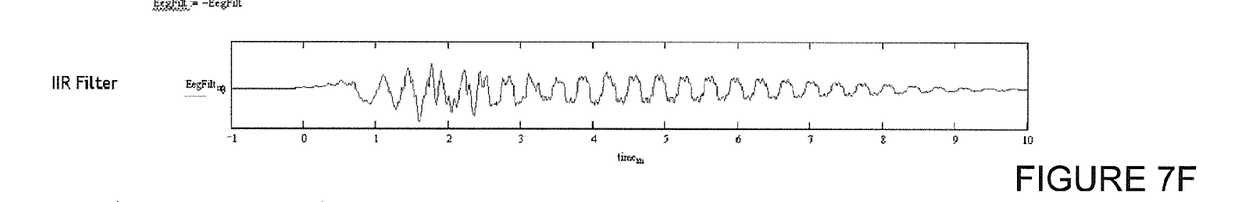
Figure 7G:
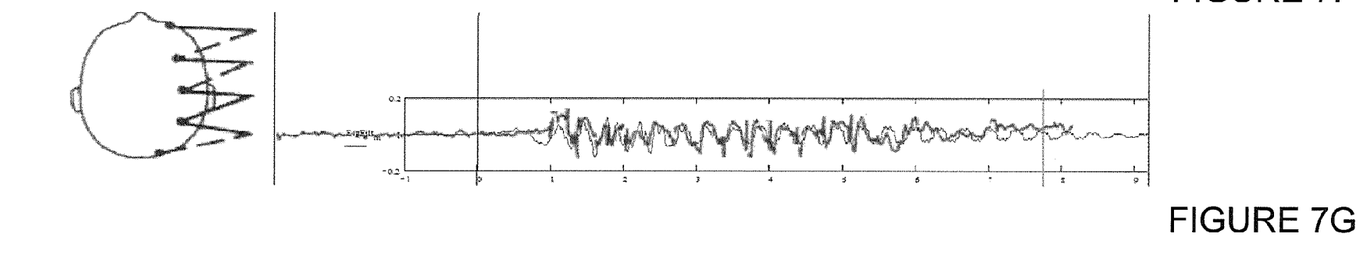

Output from this formula is illustrated in FIG. 6, which is a graph that illustrates a response of both the envelope follower 314, 414, as well as illustrates a portion of the thalamocortical loop simulation block 316, 416. An impulse train represents and simulates a PSE trigger input, shown on the left-hand side of this graph. The "r" value near the top of the graph is the four loops, while FIG. 7E illustrates ten loops. FIG. 7F simulates a very large ensemble of loops by using output from an IIR filter. FIG. 7G illustrates the simulated EEG output of FIG. 7F overlaid on an example paroxysmal EEG with the same stimulus timing, taken from literature, in order to check response timing. Note how well the simulated EEG produced with a large ensemble of loops accurately matches the actual measured EEG in FIG. 7G.

Figure 8:
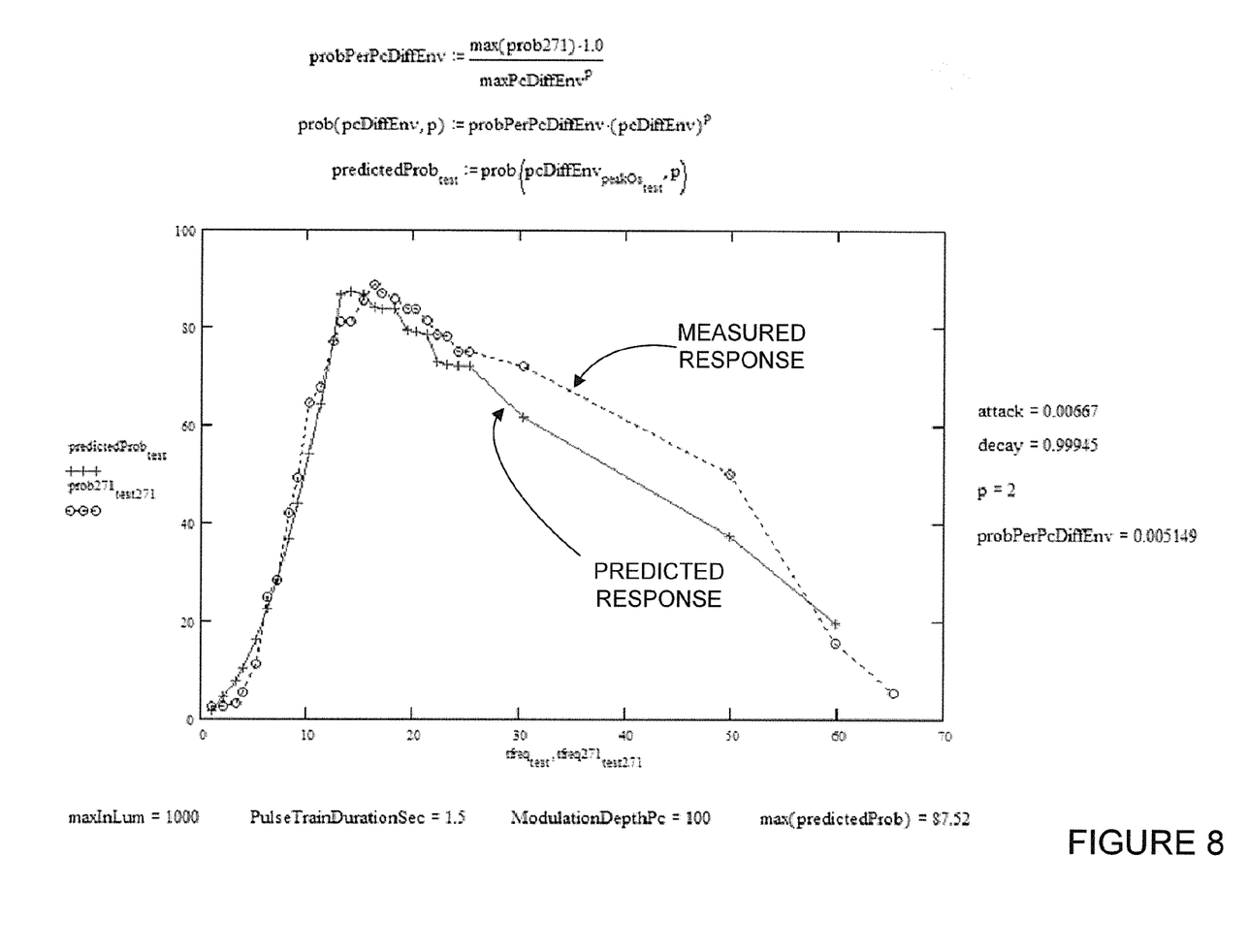
FIGS. 8 and 9 are graphs that illustrate responses, both actually measured and simulated by embodiments of the invention, of the proportion of photosensitive patients showing a photoconvulsive EEG response under certain conditions.
Figure 9:
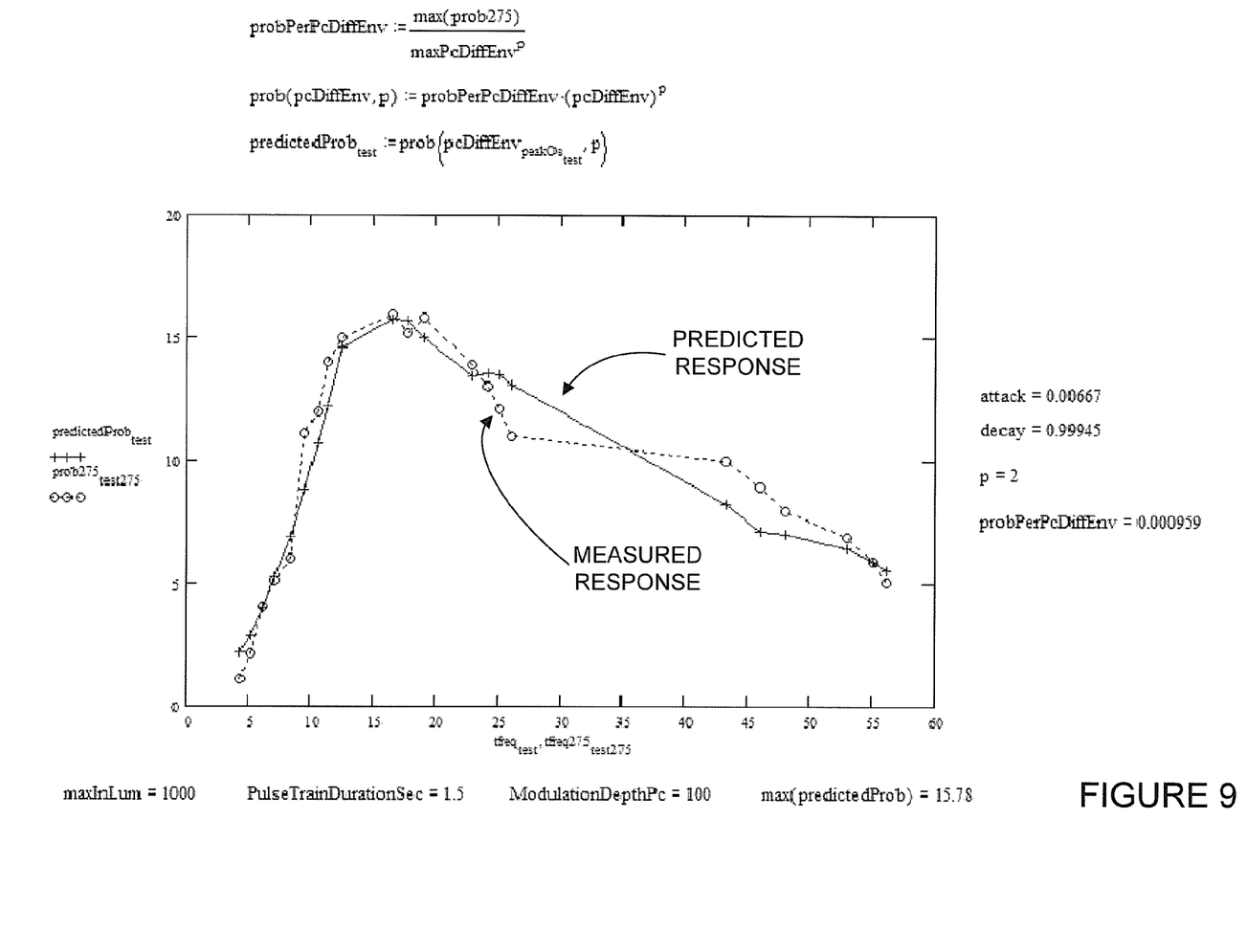

FIGS. 8-9 explain how embodiments of the invention are used to examine population sensitivities over temporal (flash) frequencies. In general, FIGS. 8-9 show the percentage of population showing photoconvulsive (paroxysmal) response to flashing at various temporal frequencies, along with simulated responses generated using embodiments of the invention, such as described with reference to FIGS. 3 and 4 above, which have been converted into probabilities according to the following set of equations:

$probPerPcDiffEnv := \dfrac{max(prob271) \cdot 1.0}{maxPcDiffEnv^p}$ $prob(pcDiffEnv, p) := probPerPcDiffEnv \cdot (pcDiffEnv)^p$ $predictedProb_{test} := prob(pcDiffEnv_{peakOs_{test}}, p)$ The value of max(prob271) is the maximum probability taken from the experimental data for a particular test number, shown in the corresponding figure, and the p (power) value, as illustrated in FIGS. 8 and 9, is 2. Thus, probPerPcDiffEnv is a normalizing constant (a scalar value) that scales the pcDiffEnv output, after being raised to the pth power, such that the maxima of the predicted response and the measured response coincide.

FIG. 8 illustrates responses, both actually measured and simulated by embodiments of the invention, of the proportion of photosensitive patients showing a photoconvulsive EEG response to intermittent light, expressed as a function of flash frequency from known studies. The stimulus was simulated using a 100% contrast temporal square wave, with a mean luminance of 1000 nits. FIG. 9 is similar to FIG. 8, except that for FIG. 8 data was taken for 170 patients (test 271), while data for only 16 patients (test 275) was used in creating the graph of FIG. 9.

Recall from above that a portion of those with photosensitive triggers are sensitive not only to flashing images, but even to static images that contain high contrast. Embodiments of the invention may also be used to provide a prediction, measured in probability, of whether people identified with having a photoconvulsive (paroxysmal) response to patterns at various spatial frequencies will in fact have a response to a particular pattern.

Figure 10:
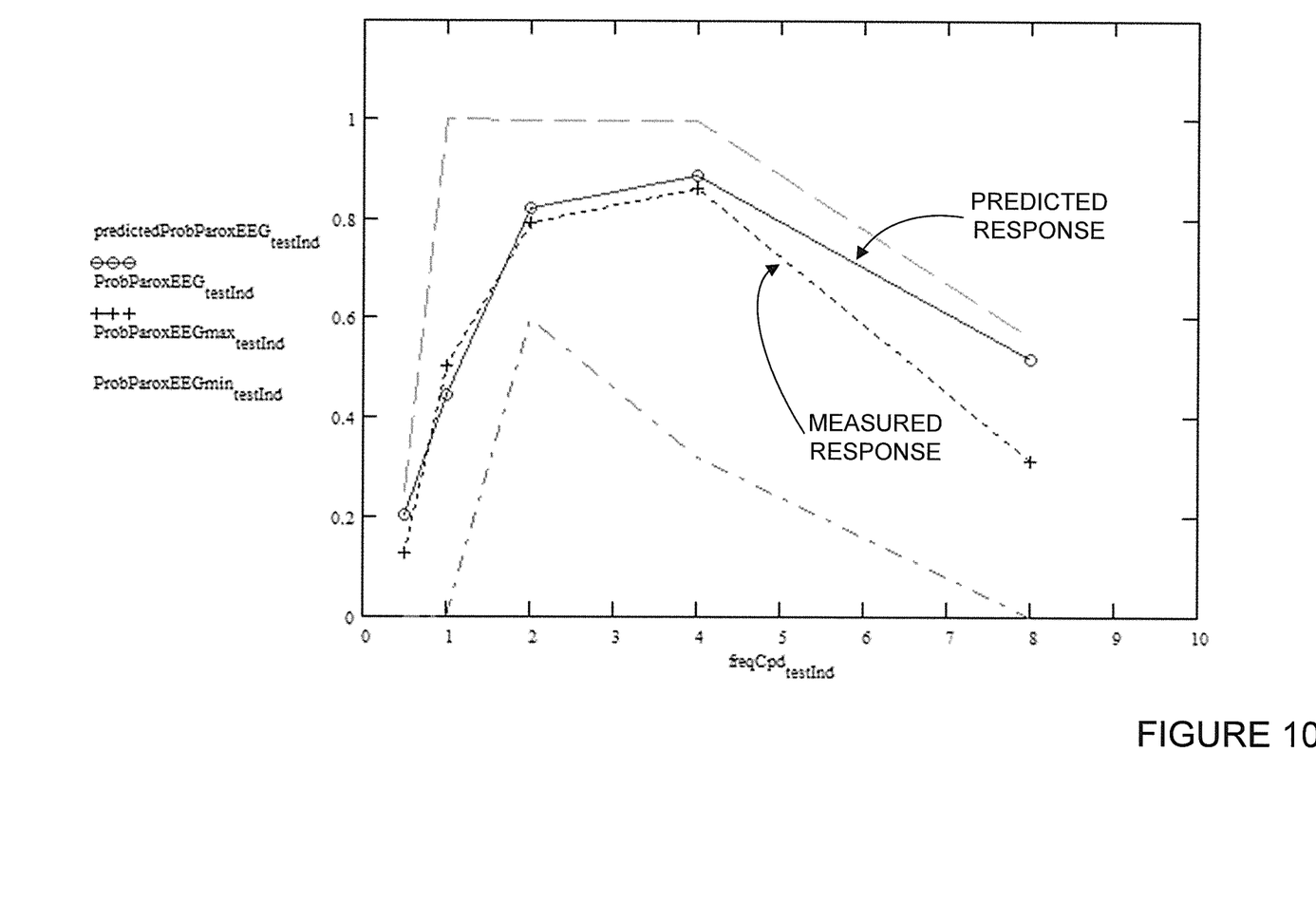
FIGS. 10 and 11 are graphs that illustrate response, both actually measured and simulated by embodiments of the invention, of the proportion of photosensitive patients showing a photoconvulsive EEG response under other conditions.
Figure 11:
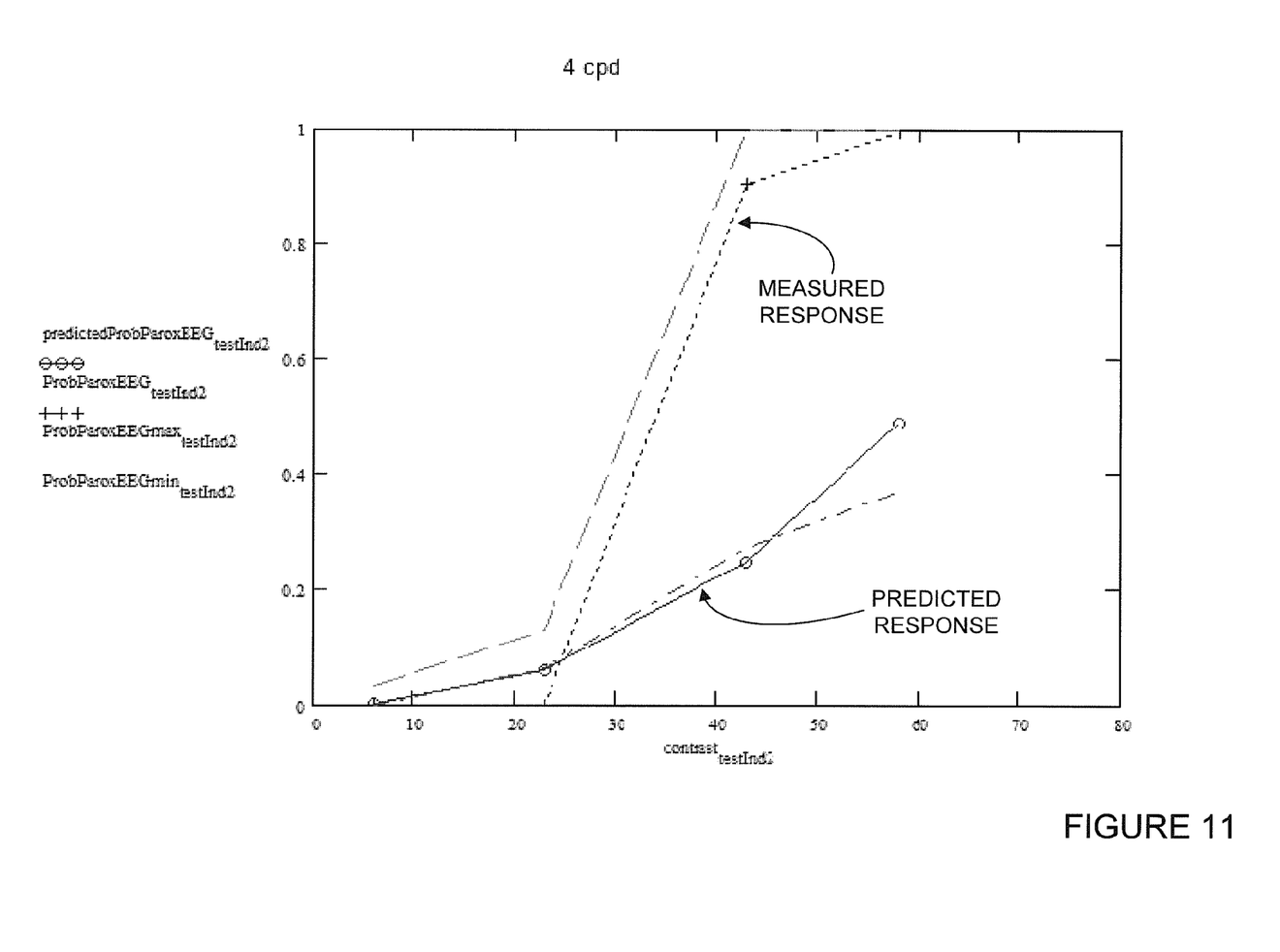

FIG. 10 illustrates responses, both actually measured and simulated by embodiments of the invention, of the proportion of photosensitive patients showing a photoconvulsive EEG response to high contrast light patterns. The stimulus to provoke the response illustrated in FIG. 10 is a pattern of bars having a 75% contrast, with a mean luminance of 300 nits. Shown in FIG. 10 are the measured responses as well as the response predicted by embodiments of the invention. Additionally illustrated in FIG. 10 are maximum and minimum measured limits. FIG. 11 is similar to that of FIG. 10, except the equivalent simulated stimulus is a 4 cpd square wave, with a mean luminance of 55 nits.

Referring back to FIGS. 3 and 4, the thalamocortical loop simulation blocks 316, 416 are useful in determining that the envelope followers 314, 414 are accurately modeling the onset, duration, and decay of paroxysmal events in the brain when subjected to PSE triggers. The justification of the simplistic approximation of the thalamocortical loop, and thus the resulting accuracy of the prediction, is due to properties of unimodal maps, which are an example of nonlinear system theory. The unimodal map approach to simulating the thalamocortical loop is based on the hypothesis that the thalamocortical loop may be approximately modeled as a logistic map with a maximum function value modulated by the envelope of the spatiotemporal perceptual contrast response. Anatomical evidence along with a universal principal of unimodal maps together provide evidence supporting this hypothesis.

Properties of Thalamocortical Loops:
Thalamocortical Loop Delay: Single Neuron
  Mean firing response delay: ~10.1 ms
  Axon signal propagation delays:
  Delay/length: 0.35-0.68 mm/ms
  Average for thalamus to cortex ~=70 mm
  Average axon delay ~=70*0.515=36.05 ms
Synaptic delay: ~21.55 ms
Thalamocortical Loop Delay: Cortical, Thalamocortical & Reticular
  Cortical, Thalamocortical: Firing+Axon+Synaptic Delays:
    10.1+36+21.55 ~=68 ms each
  Reticular: Firing+~Negligible Axon+Synaptic Delays:
    10.1+21.55 ~=32 ms
Total Thalamocortical Loop Delay:
  68 ms+68 ms+32 ms=168 ms
Compare to reaction times to visual stimuli:
  190-268 ms The above properties may be used to assemble a unimodal map.

Thalamocortical Loop Map:

$$y[n]=G1*y[n\text{-delay}]*(1-G2*y(n\text{-Delay})), \text{ where}$$

G1=(Visual cortex gain)*(Thalamocortical gain)
G2=Thalamic reticular gain
Delay=Thalamocortical loop delay This model is a form of unimodal map. Thus, it conforms to the quantitative universality property of stability, period doubling and other behavioral characteristics of unimodal maps.

Consider unimodal logistic map example:

$$x[n+1]=f(x[n])=r*x[n]*(1-x[n])$$

"Stable," "fixed" outputs correspond to the intersection of $$x[n+1]=x[n]=f(x[n])$$

"Stable" oscillations & "fixed" outputs correspond to the intersection of $$x[n+\text{delay}]=x[n]=f\text{delay}(x[n]),$$

where for delay=2, $$f2(x[n])=f(f(x[n]))=x(n+2), \text{ etc.}$$

Further, a cobweb analysis provides that if the "r" value, the output of the envelope followers 314, 414, described above, is greater than or equal to three, then this indicates that a paroxysmal response is predicted.

Next, the quantitative universality of the unimodal map period doubling says that the ratio of differences of successive r values (and corresponding x values determining relative AC amplitude) where frequency doubling takes place is approximately the same, regardless of the function f(x[n]), as long as f( ) is a unimodal map. Thus, because the model of the Thalamocortical Loop, described above, reflects the excitation and inhibition observed in the actual thalamocortical loop, both correspond to unimodal maps, and, therefore, these qualities exist similarly for both the given model and the actual neural network being modeled.

Figure 12:
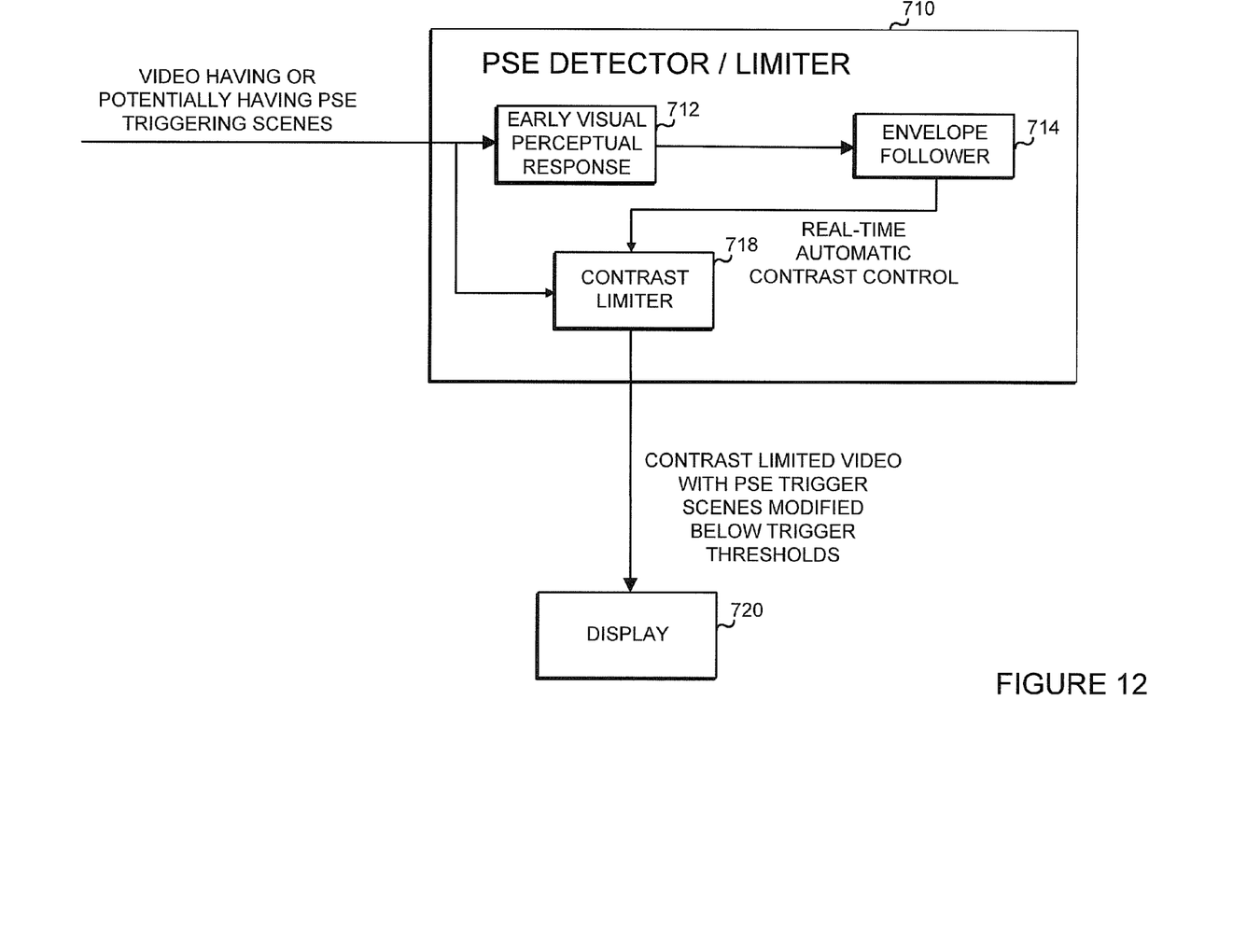
FIG. 12 is a functional block diagram of an example system that uses embodiments of the invention to actively mitigate visual stress areas of video streams.

FIG. 12 illustrates an example system that uses embodiments of the invention to actively mitigate visual stress areas of video streams. In other words, using this system, video may be processed such that it reduces the probability of causing visual stress and PSE triggers. With reference to FIG. 12, a limiter 710 receives a stream of video that may or may not include PSE triggers. A perceptual response for the video is determined in a block 712, or as described above with reference to FIG. 4, a normalized spatiotemporal bandpass filter may be substituted. Additionally, the input video may be processed using color conversion and viewing environment processing as described above with reference to FIGS. 3 and 4. An envelope follower 714 generates an output signal from its input, as described above. However, differently than above, the envelope follower 714 produces its output signal for an active contrast limiter 718, which also receives the incoming video. The active contrast limiter 718 may be internal or external to the limiter 710.

The contrast limiter 718 reduces contrast of the video input signal in relation to contrast of the input signal in relation to the maximum desired contrast, as follows:

mitigated signal=centLum*contrastReduction+surLum where

ContrastReduction=contrastLUT[desiredEnvelope-
Output]/contrastLUT[EnvelopeOutput]).

In other words, the spatiotemporal contrast is reduced by a factor required to result in the desired envelope output which corresponds to the corresponding lower target probability for causing visual stress and PSE.

A Michelson contrast is defined as:

MaxLum−MinLum/MaxLum+MinLum, where MaxLum and MinLum represent the highest and the lowest luminance of the region of interest, respectively. The contrast reduction method described above reduces this Michelson contrast.

An alternative to reducing contrast, rather than, as described above, reducing the gain of the dynamic portion of the signal, is to slowly reduce the gain over the entire video signal, then slowly raise the gain again after the PSE trigger scene has passed. Such reduction should be performed slowly, on the order of ½ second or longer, to prevent the entire video signal from quickly darkening, which itself may be a source of visual stress.

Any of the contrast processing described above may be efficiently performed in embodiments with Look Up Tables (LUTs).

In other embodiments, the detection method may be used to dynamically either mitigate or correct the video signal, as described above, or may work as an input to a later processing of the video in a camera, editing equipment, broadcast equipment, set top box, DVR, Personal Computer, or a display 720, such as a consumer television, that reduces the effect of the PSE triggering scenes.

In various embodiments, components of the invention may be implemented in hardware, software, or a combination of the two, and may comprise a general purpose microprocessor, a digital signal processor (DSP), an application specific integrated circuit (ASIC), a field-programmable gate array (FPGA), or the like.

It will be appreciated from the forgoing discussion that the present invention represents a significant advance in the field of video stress detection. Although specific embodiments of the invention have been illustrated and described for purposes of illustration, it will be understood that various modifications may be made without departing from the spirit and scope of the invention. Accordingly, the invention should not be limited except as by the appended claims.

What is claimed is:

1. A method for detecting visual stress scenes in a video, the method comprising:
   receiving a video including scenes that may cause visual stress in some viewers;
   generating a signal representing human perceptual response from scenes in the video, including:
      passing the video through a spatiotemporal filter, and
      generating a perceptual contrast portion of the perceptual response signal based on a function of a center area, a surround area, and a difference between the center and surround areas of the video;
   applying an envelope follower to the perceptual response signal; and
   indicating the video contains visual stress scenes based on the output of the envelope follower.

2. The method of claim 1 in which detecting visual stress scenes comprises detecting contrasting scenes in temporal differences.

3. The method of claim 1 in which detecting visual stress scenes comprises detecting contrasting scenes in spatial differences.

4. The method of claim 1 in which indicating the video contains visual stress scenes comprises generating a quantitative measure.

5. A method for detecting visual stress scenes in a video, the method comprising:
   receiving a video including scenes that may cause visual stress in some viewers;
   generating a signal representing human perceptual response from scenes in the video;
   applying an envelope follower to the perceptual response signal;
   indicating the video contains visual stress scenes based on the output of the envelope follower;
   converting the output of the envelope follower into a simulated EEG signal; and
   comparing the simulated EEG signal with an EEG signal produced from a human response while viewing the same video.

6. A method for detecting visual stress scenes in a video, the method comprising:
   receiving a video including scenes that may cause visual stress in some viewers;
   generating a signal representing human perceptual response from scenes in the video;
   applying an envelope follower to the perceptual response signal;
   indicating the video contains visual stress scenes based on the output of the envelope follower; and
   converting the output of the envelope follower to a probability measure.

7. The method of claim 6, in which the probability measure is made for each pixel in a video frame.

8. The method of claim 7, in which the probability measure is made for a predetermined time interval.

9. The method of claim 7, in which the probability measure is made only for a region of interest within the video frame.

10. A method for reducing visual stress scenes in a video, the method comprising:
    receiving a video including scenes that may cause visual stress in some viewers;
    generating a signal representing human perceptual response from scenes in the video;
    applying an envelope follower to the perceptual response signal;
    reducing contrast in the video based on an output from the envelope follower; and
    outputting the reduced contrast video as a reduced visual stress output.

11. The method of claim 10 in which generating a human perceptual response comprises passing the video through a spatiotemporal filter.

12. The method of claim 11, further comprising generating a perceptual contrast portion of the perceptual response signal based on a function of a center area, a surround area, and a difference between the center and surround areas of the video.

13. The method of claim 10, in which reducing contrast in the video comprises reducing contrast of the video in a final display device.

14. The method of claim 10, in which reducing contrast in the video comprises reducing a maximum luminescence of at least a portion of the video.

15. The method of claim 10, in which reducing contrast in the video comprises reducing a difference between a minimum luminescence and a maximum luminescence of at least a portion of the video.

16. The method of claim 10, in which reducing contrast in the video comprises reducing contrast of the video in a device separate from a final display device.

17. A visual stress detector for detecting scenes of a video that may cause visual stress in a viewer, the detector comprising:
- an input for receiving a video including scenes that may cause visual stress in some viewers;
- a human perceptual response generator coupled to the input;
- an envelope follower coupled to the human perceptual response generator;
- an output for generating a signal indicating those scenes of the video may cause visual stress in the viewer; and
- a mitigation circuit coupled to the envelope follower, the mitigation circuit structured to modify the video to reduce scenes that may cause visual stress to the viewer.

18. The visual stress detector of claim 17, in which the mitigation circuit is structured to reduce contrast in the video.

19. The visual stress detector of claim 17, further comprising:
- an EEG simulation circuit coupled to the envelope follower and structured to generate a simulated EEG signal.

20. A method of verification of a device structured to detect visual stress scenes in a video, the method, comprising:
- generating a signal that indicates visual stress in the video;
- from the signal that indicates visual stress, generating a simulated EEG;
- obtaining a measured EEG from one or more humans created while watching the video; and
- comparing the measured EEG to the simulated EEG.

21. The method of claim 20 in which generating a signal that indicates visual stress in a video comprises:
- generating a signal representing a human perceptual response from scenes in the video.

22. The method of claim 21, further comprising: analyzing the signal representing the human perceptual response with an envelope follower.

23. The method of claim 20, in which generating a simulated EEG comprises generating a unimodal map.

* * * * *